March 14, 1944. F. BRANDSTROM 2,343,952
CONTROL UNIT FOR COMPRESSOR SYSTEMS
Filed Feb. 26, 1943
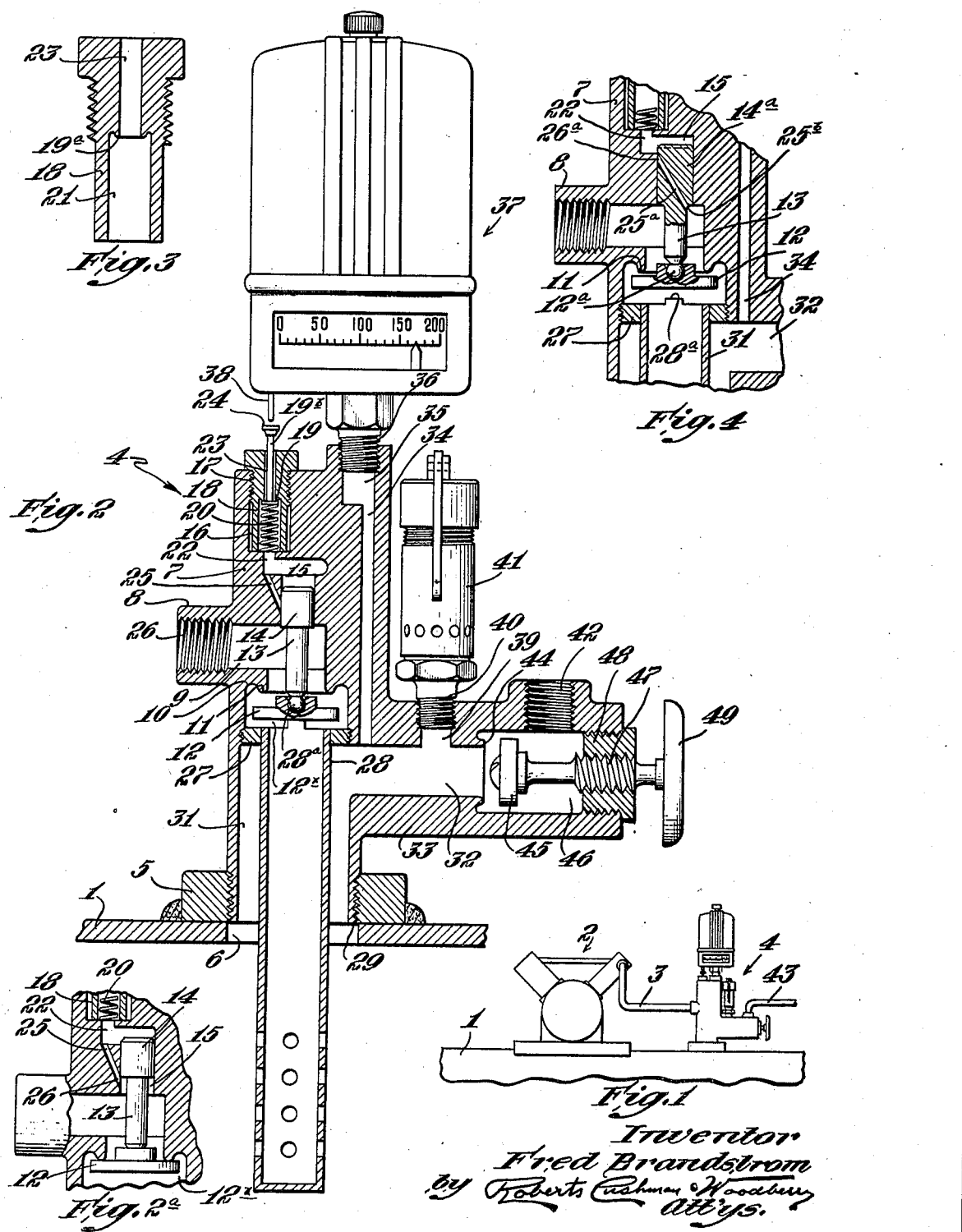
Inventor
Fred Brandstrom
by Roberts Cushman Woodbury
attys.

Patented Mar. 14, 1944

2,343,952

UNITED STATES PATENT OFFICE 2,343,952

CONTROL UNIT FOR COMPRESSOR SYSTEMS

Fred Brandstrom, Westport, Conn., assignor to Manning, Maxwell & Moore, Incorporated, New York, N. Y., a corporation of New Jersey Application February 26, 1943, Serial No. 477,252

12 Claims. (Cl. 230—17)

This invention pertains to compressor systems wherein a gaseous fluid, usually air, is compressed by a suitable compressor and forced into a closed receptacle or tank from which it is drawn as needed, the invention relating more particularly to an improved control unit for such a system.

For the safe and proper operation of such a system various accessories in addition to the compressor and tank are required. Thus it is common to provide the tank with a relief or safety valve to prevent accidental excess rise in pressure and with a gauge designed visually to indicate the pressure within the tank. It is also customary to provide a check valve in the conduit leading from the compressor to the tank. In automatically controlled systems, a pressure-responsive switch starts and stops the compressor motor in accordance with the pressure prevailing in the tank and the switch mechanism also desirably actuates an unloading valve operative to release the pressure in the conduit which leads from the compressor to the tank whenever the motor stops. The tank is also furnished with an outlet fitting (usually provided with a globe valve) to which the delivery pipe is attached, and desirably the compressed air enters the tank through a muffler device designed to lessen the rumbling noise which is normally occasioned by forcing air into a tank against pressure existing therein.

Customarily these several accessories are separate independent devices and their assembly with the tank necessitates the provision of numerous openings in the wall of the tank, while the mounting of such accessories as are not directly attached to the tank requires numerous pipe connections and fittings. The formation of many openings in the tank wall is undesirable, since every such opening lessens the strength of the tank, and wherever there is a threaded joint, either between the tank wall and one of said accessories or in the pipe connections and fittings, there is danger of leakage. Moreover, so many independent fittings and elements makes the system unduly costly and cumbersome.

A principal object of the present invention is to provide a single control fitting designed to be screwed into a threaded opening in the wall of the storage tank (or alternatively to be secured to the tank wall by usual flanged connections) said fitting being so designed and arranged as properly to support or house in assembled relation all of the several accessory elements usually employed in the control of a compressor system. A further object is to provide such a fitting which comprises within itself certain of the usual accessory devices but arranged in compact relation so that they occupy less space than when made as independent units. A further object is to provide such a control fitting which comprises within itself improved accessory devices of simple construction and which function more adequately than similar devices of the prior art. A further object is to provide such a control fitting so designed that it may readily be made, for example, as a unitary casting and which requires a minimum of machine work to complete it and with which the several accessory elements or the constituent parts thereof may readily be assembled at a minimum expense and by relatively unskilled labor.

Other and further objects and advantages of the invention will be pointed out in the following more detailed description and by reference to the accompanying drawing wherein Fig. 1 is a fragmentary elevation to small scale showing the improved control unit mounted upon a storage tank or reservoir and arranged to receive compressed air from a compressor;

Fig. 2 is a vertical section to larger scale showing a preferred embodiment of the contol unit of the present invention mounted upon the wall of a pressure reservoir;

Fig. 2ᵃ is a fragmentary section, in the same plane as Fig. 2, showing the check valve in a different position;

Fig. 3 is a vertical section to somewhat larger scale than Fig. 2, showing portions of an unloading valve structure; and Fig. 4 is a fragmentary section similar to Fig. 2 but illustrating a slight modification.

Referring to the drawing, the numeral 1 designates a tank or other reservoir for compressed gaseous fluid, for example air, the reservoir having mounted thereon a compressor 2 of any suitable type driven for example by an electric motor and which discharges the compressed air through a pipe 3 which leads to the control unit 4 of the present invention. This control unit (Fig. 2) is shown as comprising a screw-threaded nipple portion mounted in an opening in an annular pad 5 secured, for example, by welding to the wall of the tank or receptacle 1, the latter having an opening 6 in its wall which is coaxial with the opening in the pad 5.

In accordance with the present invention the control unit comprises a casing which as here illustrated is a unitary casting having an elongate upright portion 7 provided with a laterally extending internally screw-threaded boss 8 which receives the end of the air supply pipe 3 and whose interior communicates with an inlet chamber 9 within the upright part of the casing. The lower wall of this inlet chamber 9 has a delivery orifice 10 defined by an annular check valve seat 11 with which cooperates the vertically movable check valve 12 which is housed in a chamber 12ˣ directly below the valve seat 11. The valve head 12 is flexibly connected (so that it may seat squarely) by means of a ball joint 12ᵃ to the valve stem 13, the latter passing up through the inlet chamber 9 and having an elongate guide member or plunger 14 rigidly secured to its upper end. This guide member or plunger 14 has a substantially leak-tight sliding fit in an elongate cylindrical guideway 15 coaxial with the valve seat 11.

In the upper part of the upright portion 7 of the casing there is provided a chamber 16, screw-threaded at its upper end at 17 and which receives the housing 18 of an unloading valve 19 which is normally held against an annular seat 19ᵃ in the housing by means of a spring 20. This spring is arranged within a cylindrical valve chamber 21 extending downwardly from and coaxial with the valve seat 19ᵃ to the lower end of the housing 18, the lower end of this chamber 21 communicating with the upper end of the guideway 15 by means of a passage 22. A passage 23 of smaller diameter than the chamber 21 and coaxial with the valve seat 19ᵃ, extends up through the housing 18 to the upper end of the latter and within this passage 23 is arranged a valve stem 19ᵇ connected to the valve 19 and having a head 24 at its upper end. The stem 19ᵇ is square so as to provide passages extending lengthwise of the stem which are freely open at their upper ends to the atmosphere.

A leak passage or duct 25 of small transverse section leads from the passage 22 downwardly to a point 26 in the wall of the guideway 15, the point 26 being intermediate the upper and lower ends of the guideway and so located that when the valve 12 is seated against the seat 11 (Fig. 2ᵃ) the lower end of the passage 25 is uncovered so as to provide communication between the passage 22 and the inlet chamber 9, whereas when the valve 12 is unseated (Fig. 2) the lower end of the passage 25 is obstructed by the guide or plunger 14 thus cutting off communication between the inlet chamber 9 and the passage 22.

The bottom of the valve chamber 12ˣ is defined by an annular septum 27 here shown as having screw-threaded engagement with the casing proper, and this septum supports a muffler tube 28 whose upper end is rigidly secured to the septum and which extends downwardly to a point below the lower screw-threaded end 29 of the casing so as to project a substantial distance into the container or tank 1. The lower end of this muffler tube 28 is closed, but adjacent to its lower end it is furnished with perforations 30 in its wall through which the compressed air emerges into the tank 1. The tube 28 is so arranged as to receive all of the air which passes through the check valve orifice 10 and to convey such air down through the annular delivery chamber 31 in the lower part of the casing and into the tank. By the employment of this muffler tube the noise customarily occasioned when compressed air is delivered against back pressure into a container, is greatly lessened.

The annular delivery chamber 31 has a lateral extension or delivery passage 32 formed within a hollow substantially horizontal arm 33 integral with the upright portion of the casing. A duct 34 leads from this delivery passage 32 upwardly to a chamber 35 at the upper part of the upright portion of the casing, said chamber being internally screw threaded for the reception of the attaching nipple 36 of a combined pressure gauge and pressure-actuated switch 37. This combined gauge and switch device may be of any desired type (for example such as illustrated more particularly in the copending application of Fred Brandstrom, Serial No. 476,941 filed February 24, 1943) designed to respond to variations in pressure of the fluid within the container 1 and, by its action, to start or stop the motor which drives the compressor. Whatever the particular type of switch which may be employed it is essential to the present invention that this switch comprise a movable actuator pin 38 so arranged as at times to engage, the head 24 of the valve stem 19ᵇ of the unloading valve, thereby to move the valve 19 away from its seat 19ᵃ. Thus, for specific example, this actuator pin 38 should be arranged to open the valve 19 whenever the motor is stopped by the operation of the switch 37.

The hollow arm 33 of the casing is furnished with a passage 39 terminating in an internally screw-threaded socket which receives the screw-threaded attaching nipple 40 of a safety valve 41 of any suitable type. The arm 33 is also furnished with an internally screw-threaded socket 42 designed to receive a pipe 43 (Fig. 1) for conveying the compressed air from the tank 1 to the point of use.

Within the arm 33 there is formed an annular valve seat 44 with which cooperates a manually actuable valve 45 designed to control the delivery of air from the tank to the pipe 43. This valve 45 is arranged within a chamber 46 in the hollow arm 33 and has a screw-threaded stem 47 which engages a threaded opening in a plug 48 filling an opening in the end wall of the arm 33. The outer end of the stem may be provided with a hand wheel 49 for turning it so as to move the valve 45 toward and from its seat 44.

In Fig. 4 there is illustrated a slight modification of the check valve structure, the valve 12 having the stem 13 provided with the cylindrical plug or guide portion 14ᵃ which has a substantially leak-tight sliding fit in the cylindrical guideway 15. In this instance a passage 25ᵃ extends through the plug 14ᵃ from a point 25ᵇ at the lower end of the plug (where the passage is always open to the inlet chamber 9) to a point 26ᵃ in the peripheral wall of the plug. The point 26ᵃ is so located that when the valve 12 is seated against its seat 11 the upper end 26ᵃ of the passage 25ᵃ is uncovered and opens into the chamber 22, thus providing free communication between the chambers 9 and 22. However, when the valve is unseated the upper end of the passage 25ᵃ is obstructed by the wall of the guideway 15, thus cutting off communication between the chambers 9 and 22.

The operation of the device is substantially as follows: assuming that switch 37 has closed the motor circuit and lifted pin 38 away from the head 24 of the valve stem 19ᵇ, thereby closing the unloading valve, and the motor is now operating; the compressor is delivering air under pressure through the pipe 3 into the inlet chamber 9; and the check valve 12 is unseated and resting against a stop member 28ᵃ which is formed at the upper edge of the pipe 28, the stop holding the valve head 12 away from the septum 27 so as to insure free passage of air from the chamber 12ˣ to the interior of the muffler tube 28.

As thus arranged, air will continue to be delivered into the inlet chamber 9, through the check valve orifice 10 into the chamber 12ˣ, and thence through the tube 28 into the tank 1, and if the valve 45 be unseated air will pass from the tank through the annular delivery chamber 31 and the delivery passage 32 through the orifice defined by the valve seat 44 and into the pipe 43. At this time, since the valve 12 is unseated (Fig. 2) the plunger 14 obstructs the lower end of the passage 25 so that no air from the inlet chamber 9 may pass into the chamber 22. The operation will thus continue until, either by reason of the closure of the valve 45 or the cessation of demand for compressed air, the pressure builds up in the receptacle 1. When the pressure in the receptacle 1 has reached the point at which the switch 37 is set to operate, the latter will break the motor circuit thus stopping the motor and at the same time projecting the pin 38 into contact with the head 24 of the valve stem 19ᵇ. Such action depresses the pin 19ᵇ and unseats the unloading valve 19. This relieves pressure above the plunger 14 and since the pressure within the receptacle 1 is always acting against the under surface of the check valve 12, the latter will immediately seat against the seat 11. Since the rise of the plunger 14 uncovers the lower end of the duct or passage 25, the air within the inlet chamber 9, as well as that in the pipe 3, is now permitted gradually to escape through the leak passage or duct 25, the chamber 22, and outwardly through the passage 23 to the atmosphere. Thus, when the pressure in the receptacle 1 again drops to a point such as to cause the switch 37 to close the motor circuit, and lift pin 38 away from head 24 of the valve stem thereby closing the unloading valve—the motor is now free to start against atmospheric pressure alone, thus avoiding overloading at the start. In a very short time the pressure acting upon the upper side of the check valve 12 will unseat the latter, thus again closing the passage 25 by the downward movement of the plunger 14, and restoring the parts to normal condition of operation. If, during operation, the pressure in the tank should become excessive, it will be relieved by the safety valve 41.

The operation of the device illustrated in Fig. 4 is substantially the same as that of the arrangement above described except that when the valve 12 is seated, and unloading valve 19 is open to the atmosphere, the pressure fluid in the chamber 9 is permitted to escape through the passage 25ᵃ into the chamber 22 and through the unloading valve to the atmosphere. When the check valve is unseated the upper end of the passage 25ᵃ is cut off by the wall of the guideway 15.

By the provision of the device above described it is possible to arrange all of the usual adjunctive elements associated with an air compressor and receiver upon a single support so that but a single opening is necessary in the wall of the receiver. This is a great advantage not only from the fact that it does not require such undesirable weakening of the receiver wall as is necessary when several openings must be made therein and materially reduces the number of parts, pipe fittings, etc. with attendant reduction in cost, weight and volume of material employed, but it also provides in a single composite structure all of the several elements of which may be handled as a unit; which may be assembled by the manufacturer and adjusted by him; and which may be applied by the user without further adjustment and with the knowledge that when so applied the structure is ready for use and may be depended upon to function without further attention.

While certain desirable embodiments of the invention have herein been illustrated and described it is to be understood that the invention is broadly inclusive of all such modifications as may fall within the scope of the appended claims.

I claim:

1. A control unit of the class described comprising a unitary casing having means for attaching it to the wall of a tank, the casing having an inlet and a delivery chamber and an annular check valve seat defining an orifice in the wall of the inlet chamber, the casing having provision for admitting compressed air to the inlet chamber and having an unloading valve chamber which at times communicates with the inlet chamber, an unloading valve within the unloading chamber, said unloading valve having an actuating stem, the casing having a duct leading from the delivery chamber and terminating in a socket, and a pressure-actuated switch having a stem portion seated in said socket, the switch comprising an actuating element operatively related to the stem of the unloading valve thereby to unseat the unloading valve in response to the operation of the switch mechanism.

2. A control unit of the class described comprising a unitary casing having an externally screw-threaded portion for attaching the unit to the wall of a tank, said supporting portion having an interior bore constituting the body of a delivery chamber, the casing having an inlet chamber and an annular check valve seat defining an orifice in the wall of the inlet chamber, means whereby a supply conduit may be connected to the casing for communication with said inlet chamber, the casing having a cylindrical guideway coaxial with said check valve seat and leading from the inlet chamber to an unloading valve chamber, a check valve cooperable with said seat, guide means for the check valve arranged to slide in said guideway, an unloading valve controlling an exit to the atmosphere from the unloading chamber, and automatic means for actuating the unloading valve.

3. A control unit of the class described comprising a unitary casing having means for attaching it to the wall of a tank, the casing having an inlet and a delivery chamber and an annular check valve seat defining an orifice in the wall of the inlet chamber, the casing having a socket communicating with the inlet chamber for the reception of the end of a supply conduit, the casing having an elongate cylindrical guideway coaxial with the valve seat, said guideway communicating at one end with an unloading valve chamber within the casing, an unloading valve controlling the exit from said latter chamber, a check valve cooperable with the check valve seat, and a plunger constituting guide means for the check valve, said plunger having a substantially leak-tight sliding fit within the guideway, means providing a duct of small transverse section, one end of which opens into the inlet chamber and whose opposite end is closed when the check valve is unseated, the parts being so designed and arranged that movement of the plunger, as the check valve seats, affords communication between the duct and the unloading valve chamber.

4. A control unit for use with a compressor designed to deliver fluid under pressure to a receiver, the operation of the compressor being determined by a pressure-actuated switch responsive to the pressure in the receiver, said unit including a casing having an inlet chamber which receives pressure fluid from the compressor, a connected check valve and plunger, the plunger having a substantially leak-tight sliding fit in an elongate guideway in the casing and the check valve being arranged to close in response to receiver pressure when the compressor stops, means actuated by the switch when the compressor is stopped to admit atmospheric pressure to act on the free end of the plunger, means providing a duct operative, while the compressor is stopped and the check valve is seated, to provide communication between the inlet chamber and that end of the guideway within which the free end of the plunger is exposed, the parts being so designed and arranged that movement of the plunger, as the check valve opens, closes one end of said duct.

5. A control unit of the class described having a casing provided with a socket communicating at its inner end with a chamber which houses an unloading valve device, the casing having therein a delivery chamber and having an inlet chamber provided with an orifice in one wall constituting a check valve seat, the casing having an elongate guideway coaxial with the check valve seat and one end of which communicates with the unloading valve chamber, a check valve cooperable with said seat, the check valve being provided with a guide element having a substantially leak-tight sliding fit in the guideway, the casing having a duct communicating at one end with the unloading valve chamber and having its opposite end at a point in the wall of the guideway which is intermediate the ends of said guide element when the check valve is open so that the duct is then closed by said guide element, the parts being so constructed and arranged that the guide element uncovers the end of the duct to provide communication between the inlet chamber and the unloading valve chamber when the check valve is seated.

6. A control unit for use with a compressor designed to deliver fluid under pressure to a receiver, the operation of the compressor being determined by suitable stop-and-start means, said unit including a casing having an inlet chamber which receives pressure fluid from the compressor, a connected check valve and plunger, the plunger having a substantially leak-tight sliding fit in an elongate guideway in the casing and the check valve being arranged to close in response to receiver pressure when the compressor stops, means actuated by the stop-and-start means to admit atmospheric pressure to act on the free end of the plunger when the compressor is stopped, the casing having a duct leading from that end of the guideway remote from the check valve to a point in the wall of the guideway which is intermediate the ends of said plunger, the duct being closed by the plunger when the check valve is open, the parts being so constructed and arranged that the plunger uncovers the end of the duct to provide communication between the inlet chamber and that end of the guideway remote from the check valve when the check valve is seated.

7. A control unit of the class described comprising a unitary casing having means for attaching it to the wall of a tank, the casing having an inlet and a delivery chamber and an annular check valve seat defining an orifice in the wall of the inlet chamber, the casing having a socket communicating with the inlet chamber for the reception of the end of a supply conduit, the casing having therein an elongate cylindrical guideway coaxial with the valve seat, said guideway communicating at its end which is remote from the check valve with an unloading valve chamber within the casing, an unloading valve controlling an exit from said latter chamber to the atmosphere, a check valve cooperable with the check valve seat, and a plunger constituting guide means for the check valve, said plunger having a substantially leak-tight sliding fit within the guideway, the plunger having a longitudinally extending channel therein leading from that end of the plunger which is nearest to the check valve to a point in the periphery of the plunger adjacent to but spaced from the opposite end of the plunger, the parts being so designed and arranged that the latter end of the channel is closed by the wall of the guideway when the valve is unseated but is left open when the valve is seated.

8. A control unit for use with a compressor designed to deliver fluid under pressure to a receiver, the operation of the compressor being determined by suitable stop-and-start means, said unit including a casing having an inlet chamber which receives pressure fluid from the compressor, a connected check valve and plunger, the plunger having a substantially leak-tight sliding fit in an elongate guideway in the casing and the check valve being arranged to close in response to receiver pressure when the compressor stops, means actuated by the stop-and-start means to admit atmospheric pressure to act on the free end of the plunger when the compressor is stopped, the plunger having a longitudinally extending channel therein leading from that end of the plunger which is nearest to the check valve to a point in the periphery of the plunger adjacent to but spaced from the opposite end of the plunger, the parts being so designed and arranged that the end of the channel remote from the valve is closed by the wall of the guideway when the check valve is unseated but is left open when the check valve is seated.

9. In combination with a fluid compressor and a storage tank for compressed fluid, said tank having an opening in its wall, a single support designed for attachment to the tank wall, said support having within it a delivery chamber which communicates with the interior of the tank by means of said opening in the tank wall, the support also having within it an inlet chamber and having provision for connecting directly to it a supply pipe from the compressor; a delivery pipe; a pressure-actuated switch; a pressure gauge; and a safety valve,—the support also having housed within it a check valve and an unloading valve, the casing having ducts operative to convey pressure fluid to the delivery pipe, the switch, the gauge, and the safety and unloading valves, the switch comprising a movable element operative at times to open the unloading valve.

10. A control unit of the class described comprising a casing including an upright portion provided at its lower end with means for attaching the casing to the wall of a fluid container, the casing also having an elongate, hollow arm joined to the upright portion at a point spaced from the lower end of the latter, the upright portion having therein an inlet chamber and a delivery chamber, the latter communicating with the interior of the hollow arm, a check valve seat defining an orifice in the wall of the inlet chamber, the upright portion of the casing having an inlet passage leading from its exterior to the inlet chamber and also having a socket for the reception of the stem of a switch device, and a duct leading from said socket to the interior of the hollow arm, the hollow arm having a socket in its wall for the reception of the end of a delivery pipe, and a check valve cooperating with said check valve seat, the parts being so designed and arranged that during normal operation all fluid delivered through the orifice at the check valve seat passes through the delivery chamber.

11. A control unit of the class described having a casing provided with a pair of adjacent internally screw-threaded sockets one for the reception of the stem of a switch and the other for the reception of an unloading valve device, the casing having therein a delivery chamber and a delivery passage leading therefrom, the casing also having a duct leading from the delivery passage to the switch-receiving socket and having an inlet chamber and an annular check valve seat defining an orifice in the wall of the inlet chamber, the casing having therein an elongate guideway coaxial with the check valve seat, a check valve cooperable with the seat, said valve being provided with a guide element having a substantially leak-tight sliding fit in the guideway, the casing having a duct leading from the unloading valve socket to said guideway and having an inlet passage leading from its exterior to the inlet chamber, the casing also having sockets communicating with the delivery passage, one of said latter sockets being designed to receive the stem of a safety valve and the other to receive a delivery pipe, and means providing a duct arranged to receive all of the pressure fluid which escapes from the inlet chamber through the check valve orifice and to conduct said fluid completely through and to a point beyond the delivery chamber.

12. A control unit of the class described comprising a unitary casing having a nipple for attaching it to a tank wall, the casing having therein an inlet chamber and a delivery chamber, an annular check valve seat defining an orifice in the wall of the inlet chamber, the casing having a cylindrical guideway coaxial with the valve seat and which communicates at one end with the inlet chamber, the casing also having an unloading valve and a chamber for housing said valve, said latter chamber communicating with the outer end of said guideway, the casing having passages leading from the delivery chamber, said passages having terminal portions designed respectively to receive a gauge stem, the stem of a safety valve, and a delivery pipe,—the casing having an internal valve seat designed to cooperate with a manually actuated valve for controlling the entrance to the delivery pipe, the delivery chamber comprising a portion coaxial with the check valve seat, and a muffler tube arranged to receive all pressure fluid which flows through the check valve seat and to conduct it through the delivery chamber and to a point beyond the end of the attaching nipple.

FRED BRANDSTROM.